Nov. 10, 1959 W. A. MOORE 2,912,291
WELL SWAB
Filed April 2, 1957

WILLIAM A MOORE
*INVENTOR.*

BY *Cecil R. Wood*
ATTORNEY

United States Patent Office 2,912,291
Patented Nov. 10, 1959

2,912,291

WELL SWAB

William A. Moore, Dallas, Tex.

Application April 2, 1957, Serial No. 650,116

3 Claims. (Cl. 309—33)

This invention relates to well swabs, and it is particularly concerned with certain new and useful improvements in tubing swabs and swab bodies.

The principal object of the invention resides in the provision of a swab body which is especially capable of providing an effective seal in the tubing, to produce the maximum suction on the upstroke, and affords a compact and economical structure which is easily installed and possesses unusual stability and endurance.

An object of the invention is manifest in the provision of a tubing swab which is formed with a single annular cup whose lip extends upwardly in operation, and while presenting the minimum of resistance in its downward action, has maximum suction as it is drawn upwardly to create a suction in the tubing below, thus affording a seal by which the maximum amount of well fluids can be raised at each operation.

Another object of the invention is that of providing a tubing swab which can be formed in a single unit and applied to a tubular mandrel or nipple adapted to be installed on a cable or rod, as desired with a conventional type of check valve.

A still further object of the invention resides in the provision of a swab rubber whose annular cup is formed with a yieldable or flexible lip which extends upwardly and is capable of maintaining its form during both directions of operation, without being distorted downwardly, thus presenting its lip upwardly at all times to effect the greatest suction.

Another object of the invention is to provide a swab body or cup of a suitable resilient compound having an articulated reinforcing structure wholly embedded therein, yet allowing for controlled relative movements of the elements of the structure as required by manipulation of the swab body and the pressures imposed thereon.

Another object of the invention is to provide an articulated reinforcement for swab bodies which, by virtue of the relative but controlled movement between the parts thereof, uniform circumferential or radial expansion and contraction of the resilient body is made possible, which is a definite insurance against undue wear and consequent weakening of the body, usually occurring on the upper portion thereof.

Still another object of the invention is to provide a packer reinforcement whose structural characteristics are such that the composition of the packing element is allowed to flow or compress under a load but which restricts outward movement thereof, thereby prolonging the life of the packing element by minimizing the likelihood of tearing of the composition.

Another object of the invention is to provide a body reinforcing structure, through the medium of which equal distribution of frictional contact between the body and the tubing is effected whereby the wear imposed on the body will not be concentrated at any particular point.

Still another object of the invention is to provide a body reinforcing structure whose assembly is such that it will yield to radial expansions required of the body under working loads and pressures without placing any part of the structure under stress or strain, yet will prevent rupture, distention or other irregularities of contour of the body which would shorten the life of the latter and materially reduce the efficiency of the swab as a whole.

Broadly, the invention contemplates the provision of a tubing swab rubber of the general type described in Patent No. 2,480,830, dated September 6, 1949, and issued to Ivan C. Bell, but which presents structural features not embodied in the patented device.

The patent above referred to relates to a well swab having a sealing cup of the double ended reversible type. The swab shown in the patent has an annular member attached to and extending radially outwardly from a supporting mandrel section. The annular member has circumferentially spaced openings therein for engagement by the reinforcing wires of the cup. The sealing cup is molded about the reinforcing wires, which extend longitudinally beyond the adjacent ends of the cup. A pair of cooperating members are provided which overhang, and protect, the ends of the wires. One of such members comprises a thimble which acts upon the lower ends of the wires to urge them inwardly, while the opposite ends of the wires are urged outwardly for engagement with the walls of the tubing. The wires are fulcrumed intermediate their ends by engagement with the annular member.

This invention relates to a swab having a single annular cup, the lip of which extends upwardly, and which includes reinforcing wires which are pivotally connected to the mandrel intermediate their ends, as above described. The lower ends of the wires, which are shortened, yieldably engage the resilient and elastic material of the cup, whereby such material is compressed, upon movement of the opposite ends of the wires radially outwardly from the mandrel, to thereby restrict such movement of the wires and to protect the structure against distortion thereof.

While the foregoing objects are paramount, other and lesser objects will become manifest as the description proceeds, taken in connection with the appended drawings wherein.

Figure 1:
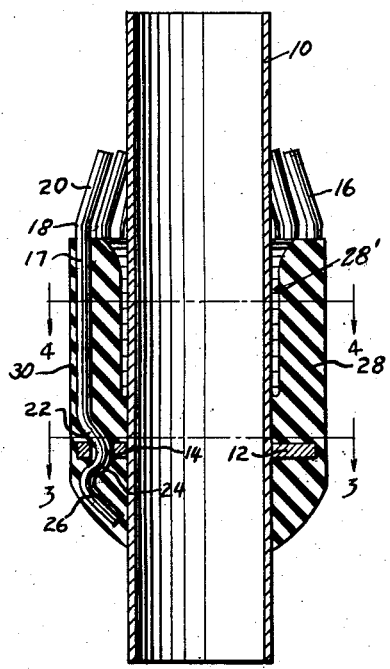
Fig. 1 is a sectional view, taken on the lines 1—1 of Fig. 3, of a swab embodying the invention.
Figure 2:
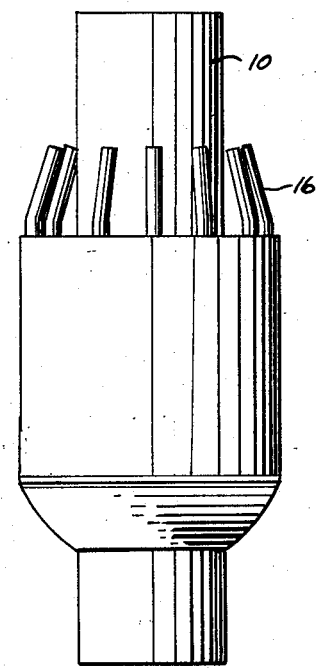
Fig. 2 is a side view of the swab shown in Fig. 1.
Figure 3:
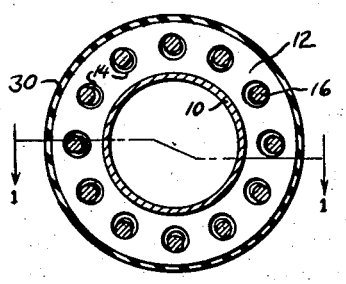
Fig. 3 is a sectional view taken on the lines 3—3 of Fig. 1.
Figure 4:
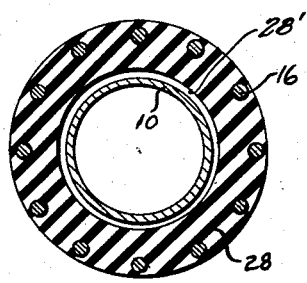
Fig. 4 is a sectional view taken on the lines 4—4 of Fig. 1.

Referring to the drawing, the numeral 10 designates a tubular member which may comprise a sleeve capable of being mounted on a swab mandrel, or alternatively, may comprise the mandrel per se. An annular member 12 is connected to the tubular member 10 and extends radially outwardly therefrom. A plurality of circumferentially spaced longitudinal openings 14 are formed in the annular member 12 for engagement, respectively, by a plurality of elongated reinforcing wires 16.

The wires 16, which preferably are formed of spring steel, are disposed substantially parallel to the axis of the tubular member 10 throughout a major portion of their length, as at 17, and are bent radially inwardly, at an obtuse angle, as at 18, adjacent their upper ends. The lower ends of the wires 16 are curved downwardly and radially inwardly, as at 22, then downwardly and radially outwardly, as at 24, then downwardly and radially inwardly again, as at 26. The wires 16 are passed through the respective openings 14 in the annular member 12, and are positioned relative thereto with the curved portion 22 above, and the curved portion 24 below, the annular member 12.

An annular cup 28, which is formed of elastic, resilient material and has an upwardly extending lip which is formed with an inwardly recessed portion to provide an annular space 28' about the mandrel or tubular member 10 and is molded about the tubular member 10, the annular member 12 and the wires 16. The upper end of the annular cup 28 is positioned below the upper ends of the wires 16.

The annular member 12 is the maximum diameter of the rigid portion of the swab, and is smaller than the normal diameter of the pipe being swabbed, which permits ready operation through pipe of deformed cross section. The remainder of the assembly readily adapts itself to conform to the deformed pipe sections.

For the purpose of easily molding the resilient materail 28 onto the structure, the wires 16 advantageously may be preformed, and thereafter passed through the openings 14 in the annular member 12. The openings 14 are large enough to readily permit pivotal action of the wires 16 therein and to provide for an expansion and contraction, or breathing action, of the cup after it is completed. The resilient material 28 is then formed or molded about the tubular member 10 adjacent the annular member 12 and the wires 16. The lip of the cup, which extends upwardly, is spaced radially from the tubular member 10.

The wires 16 are fulcrumed intermediate their ends by engagement with the annular member 12, as above described. The lower ends of the wires 16, which are relatively short, yieldably engage the resilient and elastic material of the cup 28, whereby such material is compressed, upon movement of the opposite ends of the wires 16 radially outwardly from the mandrel, to thereby restrict such movement of the wires 16 and to protect the structure against distortion thereof.

The invention may be modified in various ways without departing from the spirit and scope thereof.

What is claimed is:

1. A well swab comprising a tubular support, an annular member rigidly connected to the tubular support and extending radially outwardly therefrom, the annular member having a plurality of circumferentially spaced longitudinal openings therein, a molded elastic cup having a thickened bottom portion bonded to and encircling the tubular support, and having the annular member embedded therein, and an annular side wall portion integral with the bottom portion and spaced radially outwardly from the tubular support, the outer periphery of the annular member approaching the peripheral surface of the cup, a plurality of circumferentially spaced, longitudinally extending reinforcing wires embedded in the cup near its peripheral surface, the upper ends of the wires extending longitudinally outwardly beyond the adjacent end of the cup and being bent radially inwardly at an obtuse angle, the wires each having a radially inwardly extending arched portion spaced inwardly from its lower end, the arched portions of the wires each being passed through one of the openings of the annular member whereby the wires are pivotally connected to the annular member.

2. The structure of claim 1, the lower ends of the wires being embedded in the cup and the arrangement being such that radially outward movement of the upper ends of the wires is restrained by pivotal movement of the wires about the annular member and by compression of the material of the cup between the lower ends of the wires and the tubular support.

3. The structure of claim 1, the diameter of the cup being progressively reduced adjacent its lower end and the lower ends of the wires approaching the lower end of the cup and being bent radially inwardly to conform to the shape thereof.

References Cited in the file of this patent

UNITED STATES PATENTS

| | | |
|---|---|---|
| 2,466,572 | Bowerman et al. | Apr. 5, 1949 |
| 2,480,830 | Bell | Sept. 6, 1949 |